United States Patent
Lin et al.

(10) Patent No.: US 8,204,988 B2
(45) Date of Patent: Jun. 19, 2012

(54) CONTENT-BASED AND TIME-EVOLVING SOCIAL NETWORK ANALYSIS

(75) Inventors: Ching-Yung Lin, Hawthorne, NY (US); Spyridon Papadimitrion, Hawthorne, NY (US); Jimeng Sun, Hawthorne, NY (US); Kun-Lung Wu, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/552,812

(22) Filed: Sep. 2, 2009

(65) Prior Publication Data

US 2011/0055379 A1 Mar. 3, 2011

(51) Int. Cl.
*G06F 15/173* (2006.01)
(52) U.S. Cl. .................... 709/224; 709/220
(58) Field of Classification Search .......... 709/220, 709/224
See application file for complete search history.

(56) References Cited

U.S. PATENT DOCUMENTS

| | | | |
|---|---|---|---|
| 6,189,002 B1 | 2/2001 | Roitblat | |
| 7,856,411 B2 * | 12/2010 | Darr | 706/45 |
| 2003/0112989 A1 * | 6/2003 | Jung | 381/316 |
| 2003/0167324 A1 * | 9/2003 | Farnham et al. | 709/224 |
| 2008/0168375 A1 * | 7/2008 | Papadimitriou et al. | 715/772 |
| 2008/0279419 A1 * | 11/2008 | Kluesing et al. | 382/100 |
| 2009/0049017 A1 * | 2/2009 | Gross | 707/3 |
| 2009/0234899 A1 * | 9/2009 | Kramer | 708/200 |
| 2010/0185578 A1 * | 7/2010 | Chi et al. | 706/52 |
| 2010/0235489 A1 * | 9/2010 | Cogan | 709/224 |

OTHER PUBLICATIONS

Latent Semantic Analysis from Wikipedia, the free encyclopedia, http://en.wikipedia.org/wiki/Latent_semantic_analysis on Jul. 26, 2011.
Karypis, G. et al., "Multilevel k-way Partitioning Scheme for Irregular Graphs" Journal of Parallel and Distributed Computing (1998) pp. 96-129, vol. 48.
Kolda, T.G. et al., Tensor Decompositions and Applications SIAM Review (2009) pp. 455-500, vol. 51, No. 3.
Bader, B.W. et al., "Efficient Matlab Computations with Sparse and Factored Tensors" SIAM Journal on Scientific Computing (2007) pp. 205-231, vol. 30, No. 1.
Drineas, P. et al., "A Randomized Algorithm for a Tensor-Based Generalization of the Singular Value Decomposition" Technical Report, YALEU/DCS/TR-1327 (Jun. 2005) pp. 1-20.

* cited by examiner

*Primary Examiner* — Phuoc Nguyen
(74) *Attorney, Agent, or Firm* — Scully, Scott, Murphy & Presser, P.C.; William Stock, Esq.

(57) ABSTRACT

System and method for modeling a content-based network. The method includes finding single mode clusters from among network (sender and recipient) and content dimensions represented as a tensor data structure. The method allows for derivation of useful cross-mode clusters (interpretable patterns) that reveal key relationships among user communities and keyword concepts for presentation to users in a meaningful and intuitive way. Additionally, the derivation of useful cross-mode clusters is facilitated by constructing a reduced low-dimensional representation of the content-based network. Moreover, the invention may be enhanced for modeling and analyzing the time evolution of social communication networks and the content related to such networks. To this end, a set of non-overlapping or possibly overlapping time-based windows is constructed and the analysis performed at each successive time interval.

21 Claims, 8 Drawing Sheets

CONTENT-BASED AND TIME-EVOLVING SOCIAL NETWORK ANALYSIS

BACKGROUND

1. Field of the Invention

The present invention generally relates to the field of social network analysis. More particularly, the invention relates to a system for analyzing social networks that consist of one or a plurality of network dimensions, one or a plurality of content dimensions, and, that evolve over time.

2. Description of Related Art

With the emergence and rapid proliferation of social media, such as instant messaging (e.g., IRC, AIM, MSN, Jabber, Skype), sharing sites (e.g., Flickr, Picassa, YouTube, Plaxo), blogs (e.g., Blogger, WordPress, LiveJournal), wikis (e.g., Wikipedia, PBWiki), microblogs (e.g., Twitter, Jaiku), social networks (e.g., MySpace, Facebook, Ning), to mention a few, anyone can produce content which (i) exists in a highly connected web of contexts (e.g., social groups, geographic locations, time, etc.), and (ii) is attributable to its creator. For example, over 92% of blogs contain explicit personal information on their front pages, and over 31% include full names of the authors. Furthermore, an increasing number of people, especially among the younger generation, casually accept that the story of their lives could be found by anyone at any time and even tend to "think of themselves as having an audience'."

There is little doubt that networks which arise from all sorts of digital and social media, which combine content with people and context, are becoming prevalent and here to stay. If anything, such corpora will become even more abundant and easier to access. Therefore, there is a clear need for methods and techniques to analyze, navigate and search them. We focus specifically on networks where the context of each content item is a set of direct neighbors. Such social networks arise from pair-wise communications, such as email, instant messaging (IM) or mobile text messaging (SMS).

Typical approaches to analyzing such networks focus on either the content (e.g., list of words or terms) or on the pair-wise associations, in isolation. Furthermore, time is usually ignored in the analysis.

On one hand, content-based analysis such as latent semantic indexing analyzes the relationship between documents and terms by identifying hidden concepts related to documents and terms. On the other hand, social network analysis, such as graph partitioning, tries to identify communities among people based only on links among individuals. In the past, many techniques considered these two aspects in isolation. In this case, ad-hoc post-processing has to be done in order to glue the results from each aspect (content- and network based), which creates overhead in terms of both performance and quality. The main reason is that in many traditional settings, content is associated with nodes in the graph (e.g., words in a web page) rather than with edges (e.g., the words used in all emails between two specific individuals).

Content analysis methods, such as latent semantic indexing, examine the relationship between documents and terms and identify hidden term concepts. On the other side, social network analysis methods, such as graph partitioning, try to identify communities among people. Content and network analysis have been traditionally treated separately, even though most applications generate content-based networks. Moreover, the network and content aspects are rarely independent (e.g., I may talk with co-workers about work-related topics, while I talk with friends about entertainment-related topics). As a result, ad-hoc post-processing is necessary to glue the results from two different sources (content and network), which causes deterioration of both performance and quality.

In addition to the content and network dimensions, most applications also include a time dimension. The set of social contacts, the set of topics as well as the inter-relationship among them all evolve over time: new groups are formed, old groups or contacts may lose their strength, new topics may emerge whereas others may become less important, or the strength of the relationship among a social group and the topics it discusses may change over time. A limited number of methods exist which analyze either social network evolution or content evolution in isolation. However, methods for joint analysis and summarization over time do not exist.

SUMMARY

In one aspect, there is provided a system, method and computer program product for analyzing, summarizing, navigating and searching a growing corpus of valuable information present in time-evolving, content based social networks.

In accordance with the system and method, raw information of content-based social networks is typically obtained through communication flows, such as emails in the form of <sender, recipient, message>. These data are modeled as content-based network tensors, a tensor being a generalized 'quantity' expressed as a multi-dimensional array relative to a choice of basis of a particular space on which it is defined. For example, the message body of an email may be represented using a vector space model (i.e., bag-of-words approach) such that a data corpus consisting of emails between many users can be modeled as a third order tensor of sender, recipient, and keyword modes. Here sender and recipient are the network modes and keyword is the content mode of a third order network tensor.

The method includes finding single mode clusters from among network (sender and recipient) and content dimensions represented as a tensor data structure and allows for derivation of useful cross-mode clusters (interpretable patterns) that reveal key relationships among user communities and keyword concepts for presentation to users in a meaningful and intuitive way.

In a further aspect of the invention, the derivation of useful cross-mode clusters is facilitated by constructing a reduced dimensional representation of the content-based network.

The system and method may be enhanced for modeling and analyzing the time evolution of social communication networks and the content related to such networks. To this end, a set of non-overlapping or possibly overlapping time-based windows is constructed and the analysis performed at each successive time interval.

According to one aspect of the invention, there is provided a computer-implemented system for modeling and analyzing the time evolution of social communication networks and the content related to such networks. The system includes an input device configured for receiving data representing a social communication network; and, a processing unit coupled to the input device. The processing unit performs steps of: (a) constructing a multi-mode tensor having one or a plurality of content dimensions and one or a plurality of network dimensions, the constructing being performed at each of a plurality of successive time intervals; (b) modeling each mode of the tensor and identifying clusters on all modes for each data representation in each corresponding time interval, identifying, from content and network dimensions of the clusters, correlations across modes to identify interpretable patterns in each corresponding time interval; (c) extracting the interpretable patterns based on correlations across the content and network dimensions in each corresponding time interval, and, (d) generating a visualization of the interpretable patterns extracted in the social communication network. An output device is provided that is configured for visualizing the interpretable patterns extracted in the social communication network.

According to one aspect of the invention, there is provided a method implemented in a computer system for modeling and analyzing social communication networks and the content related to such networks. The method includes: constructing a data representation of a social communication network as a multi-mode tensor having one or a plurality of content dimensions and one or a plurality of network dimensions; modeling each mode of the tensor and identifying clusters on all modes; identifying, from content and network dimensions of the clusters, correlations across modes to identify interpretable patterns; extracting the interpretable patterns based on correlations across the content and network dimensions; and generating a visualization of the interpretable patterns extracted in the social communication network. A program using a processor unit executes one or more of the constructing, modeling, cluster identifying, pattern extracting and generating steps.

According to another aspect of the invention, there is provided an apparatus comprising a program storage device readable by machine, tangibly embodying a program of instructions executable by the machine to perform a method for modeling and analyzing the time evolution of social communication networks and the content related to such networks. The method comprises: constructing a data representation of a social communication network as a multi-mode tensor having one or a plurality of content dimensions and one or a plurality of network dimensions, the constructing being performed at each of a plurality of successive time intervals; modeling each mode of the tensor and identifying clusters on all modes for each data representation in each corresponding time interval; identifying, from content and network dimensions of the clusters, correlations across modes to identify interpretable patterns in each corresponding time interval; and, extracting the interpretable patterns based on correlations across the content and network dimensions in each corresponding time interval, and generating a visualization of the interpretable patterns extracted in the social communication network.

According to a further aspect of the invention, there is provided a method implemented in a computer system for modeling and analyzing the time evolution of social communication networks and the content related to such networks. The method comprises: constructing a data representation of a social communication network as a multi-mode tensor having one or a plurality of content dimensions and one or a plurality of network dimensions, the constructing being performed at each of a plurality of successive time intervals; modeling each mode of the tensor and identifying clusters on all modes for each data representation in each corresponding time interval; identifying, from content and network dimensions of the clusters, correlations across modes to identify interpretable patterns in each corresponding time interval; extracting the interpretable patterns based on correlations across the content and network dimensions in each corresponding time interval; and generating a visualization of the interpretable patterns extracted in the social communication network. In this aspect, a program using a processor unit executes one or more of the constructing, modeling, cluster identifying, pattern extracting and generating steps.

Further to this aspect, the modeling of each mode of the tensor further comprises: performing a tensor decomposition on the data representation to reduce dimensionality of the social communication networks.

Further to this aspect, the modeling of each mode of the tensor the data representation of a social communication network further includes a time dimension, the interpretable patterns being extracted according to a specified time and duration.

Thus, the method further includes constructing a corresponding data representation of the social communication network at each of successive corresponding time interval; and, determining how the extracted the interpretable patterns change over time.

Thus, advantageously, a method is provided to simultaneously analyze both the network and content aspects, based on tensor modeling and decomposition techniques. This approach produces meaningful clusters on both the network and content aspects. Further, the results of the method can also be leveraged to produce concise yet informative context specific visualizations of very large networks.

BRIEF DESCRIPTION OF THE DRAWINGS

The drawings are provided for illustrative purpose only and do not necessarily represent practical examples of the present invention to scale. In the figures, same reference signs are used to denote the same or like parts.

DETAILED DESCRIPTION

In the analysis of content-based network tensors, according to the invention, a two-level process is implemented. First, given a content-based network tensor, the content and network modes are analyzed in an efficient and robust manner to generate clusters. In this case, each mode of the tensor is modeled. Second, once the clusters on all modes are identified, the correlations across different modes are efficiently identified. In this case, those clusters are correlated for cross-mode patterns. For example, in the email tensor, groups of people (communities) and groups of keywords (concepts) are associated to find patterns of the form "who talks to whom about what."

In the following description directed to performing tensor analysis, there is referred in Table 1 below the following generic symbols:

TABLE I

| Sym. | Definition |
|---|---|
| $\mathcal{X} \in \mathbb{R}^{I_1 \times \ldots \times I_M}$ | data tensor |
| $X_{(d)}$ | mode-d matricization |
| $y \in \mathbb{R}^{R_1 \times \ldots \times R_M}$ | core tensor |
| $U^{(d)} \in \mathbb{R}^{I_d \times R_d}$ | mode-d factor matrix |
| $\{U\}$ | all factor matrices |
| $U(i,:)$ | the i-th row of a matrix |
| $C^{(d)}$ | dimension clustering (partitioning) on mode-d |
| $K_d$ | number of clusters along mode-d |
| $C_i^{(d)}$ | the i-th cluster along mode d, $1 \leq i \leq K_d$ |
| $I^{(d)}$ | dimension index set along mode d |
| $\{I\}$ | collection of dimension sets for all modes |
| $x(I^{(1)},\ldots,I^{(M)})$ | sub-tensor induced by $\{I\} \equiv (I^{(1)},\ldots,I^{(M)})$ |

The data model used for the analysis conducted in accordance with the present invention is now described. As mentioned, the raw information of content-based social networks are typically obtained through communication flows, such as emails in the form of <sender, recipient, message>. Such data is modeled as content-based network tensors, defined as follows:

A content based network tensor is a tensor $X \in \Re^{I_1 \times \ldots \times I_M \times J_1 \times \ldots \times J_M}$ with two sets of modes: N network modes of dimensionality $I_1, \ldots, I_N$ and M content modes of dimensionality $J_1, \ldots, J_M$. The element $X_{i_1 i_2 \ldots i_M j_1 j_2 \ldots j_M}$ in tensor X is the joint weight of the network dimensions $i_1 i_2 \ldots i_M$ and content dimensions $j_1 j_2 \ldots j_M$.

Figure 1:
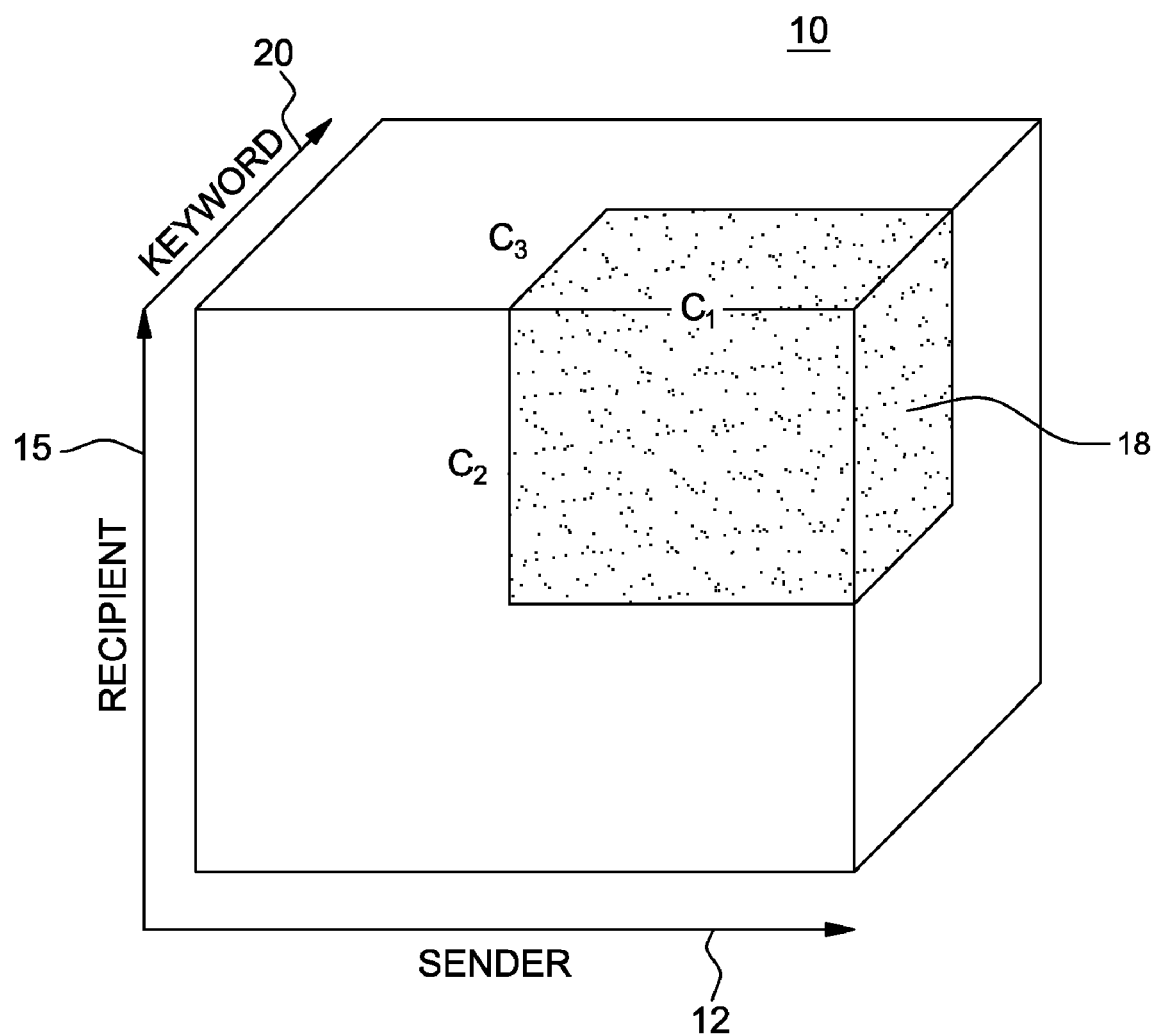
FIG. 1 is a conceptual diagram of a content-based network tensor with two network modes (sender and recipient) and one content mode (keyword) used in the analysis conducted by the embodiments of the present invention.

For example, if the body of a message of an email is represented using a well-established vector space model (i.e., bag-of words approach), then a data corpus consisting of emails between many users can be modeled as a third order tensor of sender, recipient, and keyword modes. An example third order tensor 10 is shown in FIG. 1 that includes a sender network mode 12 (C1) and recipient network mode 15 (C2) and a keyword content mode 20 (C3). The $(i_1, i_2, j)$ element of the tensor is a variable that indicates whether person $i_1$ sent an email to person $i_2$ which contained the keyword j. This variable may be weighted (e.g., similar to the TFIDF score in information retrieval) or simply a binary indicator variable. The present invention is not limited to either embodiment, and the method of the invention contemplates use of both. For purposes of discussion, the present invention is described in accordance with binary indicator variable weights.

The content-based network tensor is typically very sparse, since people only send emails to a few of their colleagues or friends, using a small subset of keywords—fortunately, nobody knows everyone in the world, and everything in every language. There are many options for storing sparse tensors. Here, the coordinate format as proposed in the reference to B. W. Bader and T. G. Kolda entitled "Efficient MATLAB computations with sparse and factored tensors" in SIAM J. Sci. Comput., 30(1):205-231, 2007, may be used in one embodiment. By storing only the non-zero entries along with their indices, memory space is needed for just (M+1)P elements, where P is the number of non-zeros and M is the number of modes.

According to embodiments of the invention, the analysis of content-based network tensors implements a two-level process. First, given a content-based network tensor, the method analyzes the content and network modes in an efficient and robust manner. To this end, each mode of the tensor is modeled. For purposes of discussion, and in a non-limiting example, clustering applications is the focus. Second, once the clusters on all modes are identified, the method performs determining how to efficiently identify the correlations across different modes. To this end, those clusters have to be correlated for cross-mode patterns. For example, in the "e-mail" tensor described herein above, it is desired to associate groups of people (communities) and groups of keywords (concepts) to find patterns of the form "who talks to whom about what", for example.

Level 1) Mode Clustering:

The first step in discovering clusters (i.e., groups of dimensions) in each mode is to apply the Tucker decomposition on the original network tensor X. This serves a dual purpose: (i) similar to SVD (Single Value Decomposition), it discovers the appropriate coordinates for each mode, that capture the main correlations present in the data, allowing for the examination of each mode independently of the others, and (ii) it reduces the number of dimensions, thus significantly speeding up pairwise similarity computations, which are necessary for clustering. Next, a clustering algorithm is applied on each of the factors $U^{(d)}$. The end result is a set of clusters (groups of dimensions) on each mode of the tensor.

For purposes of discussion, "dimension cluster" and "clustering" is defined according to the following:
a mode-d dimension cluster $C_i^{(d)}$ is a set of dimensions in mode-d and a mode-d dimension clustering $C^{(d)}$ is a partition of all dimensions of mode-d into $K_d$ dimension clusters.

Formally, $C^{(d)}$ is a label vector that represents a mapping from each dimension $i_d$, for $1 \leq i_d \leq I_d$, to a cluster label $C^{(d)}(i_d)$ where $1 \leq C^{(d)}(i_d) \leq K_d$. The set of all dimensions assigned to the i-th label is $C_i^{(d)} = \{i_d | C^{(d)}(i_d) = i\}$. The number of clusters in $C^{(d)}$ is denoted by $K_d$. The cluster sizes, i.e., number of dimensions in $C_i^{(d)}$, for $1 \leq i \leq K_d$, are denoted by $|C_i^{(d)}|$.

Level 2) Cross-Mode Analysis:

Notation is introduced to describe sub-tensors, which are formed by selecting a subset of dimensions along each mode. For purposes of discussion, a dimension index set is $I^{(d)}$ along mode d is defined as a subset of the possible indices $i_d$, for $1 \leq i_d \leq I_d$, along mode d of tensor X. It's cardinality is denoted by $|I^{(d)}|$. An ordered collection of index sets, one for each mode, is denoted by $\{I\} \equiv (I^{(1)}, \ldots, I^{(d)}, \ldots, I^{(M)})$. Given such a collection, the sub-tensor $X(I^{(1)}, \ldots, I^{(d)}, \ldots, I^{(M)}) \equiv X(\{I\})$ is the $|I^{(1)}| \times \ldots \times |I^{(M)}|$ tensor formed by selecting the corresponding subsets of dimensions along each mode d, for $1 \leq d \leq M$. Note that a dimension cluster $C_i^{(d)}$ as defined above is an dimension index set. A combination of different clusters, one from each mode, defines a cross-mode cluster and its associated sub-tensor.

For purposes of discussion, a Cross-mode cluster is defined as a set of dimension clusters $\{C\} = (C_{i_1}^{(1)}, \ldots, C_{i_M}^{(M)})$ defines a cross-mode cluster and its associated sub-tensor $X(\{C\})$. Thus, for example, the shaded area 18 in FIG. 1 is a sub-tensor induced by dimension clusters $C_1^{(1)}$, $C_1^{(2)}$, and $C_1^{(3)}$.

Content-Based Network Analysis

Figure 2:
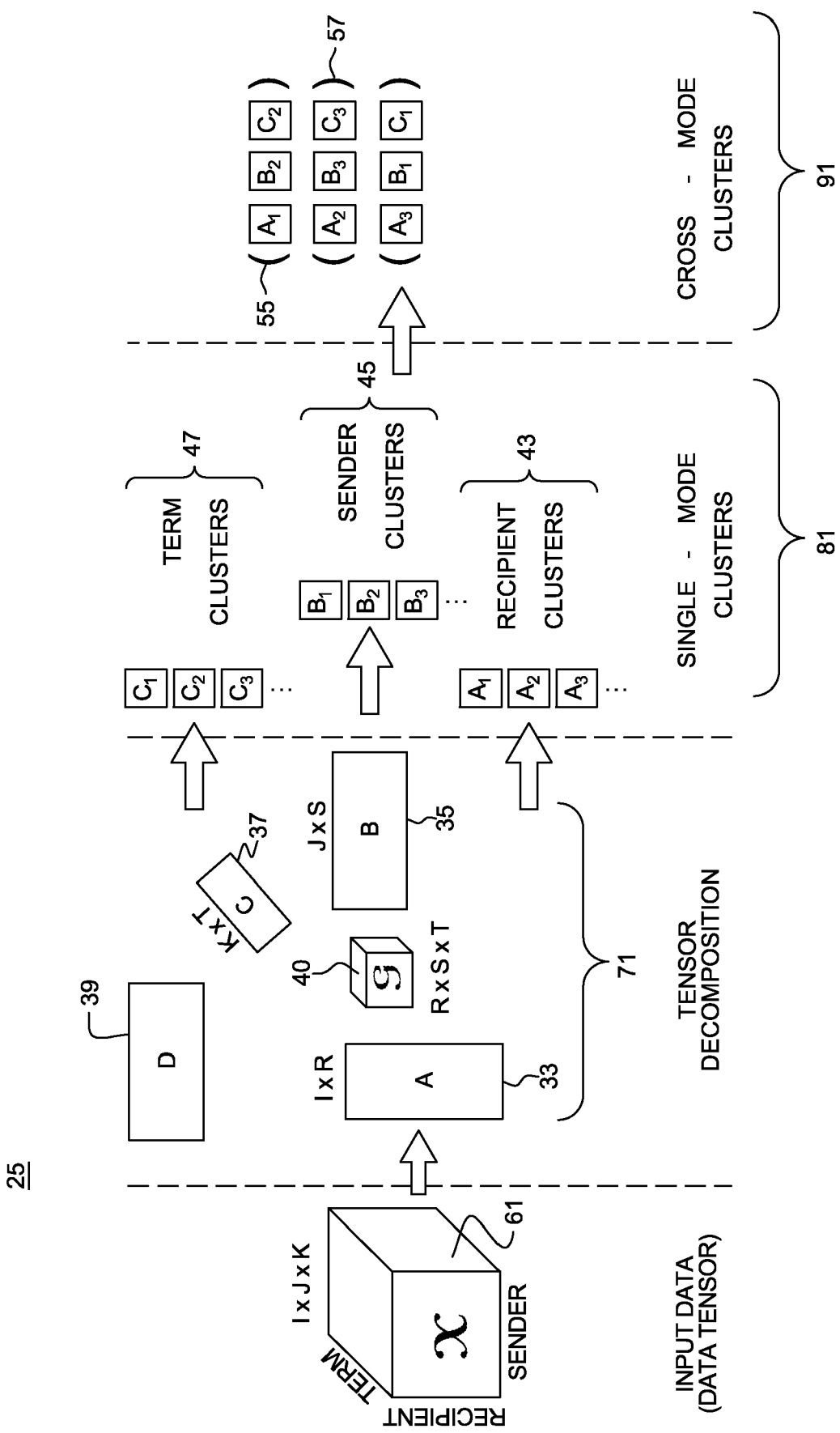
FIG. 2 depicts the overall Network analysis through tensor decomposition process of embodiments of the present invention using the tensor example of FIG. 1.

The method 25 for network analysis on content-based social network tensors is now described with respect to FIG. 2. First, there is performed a high-order dimensionality reduction process using tensor decomposition. Second, the low-dimensional representation along each Mode is leveraged for clustering. Third, input tensor is utilized to find dense connections across clusters from different modes. FIG. 2 depicts the overall network analysis through tensor decomposition process using the "e-mail" tensor example of FIG. 1.

As shown in FIG. 1, data is provided as input in a tensor data structure represented as a tensor 61 including multiple modes, which are the main targets in the analysis. For example, in the non-limiting e-mail tensor described herein for explanation purposes, the sender, recipient and keyword (concept) modes, are modeled either independently or jointly. The input data tensor 61 is input to a computer or server implementing a processing unit performing the social network analysis steps embodied as computer program instructions for execution by the processing unit as described herein.

Figure 3:
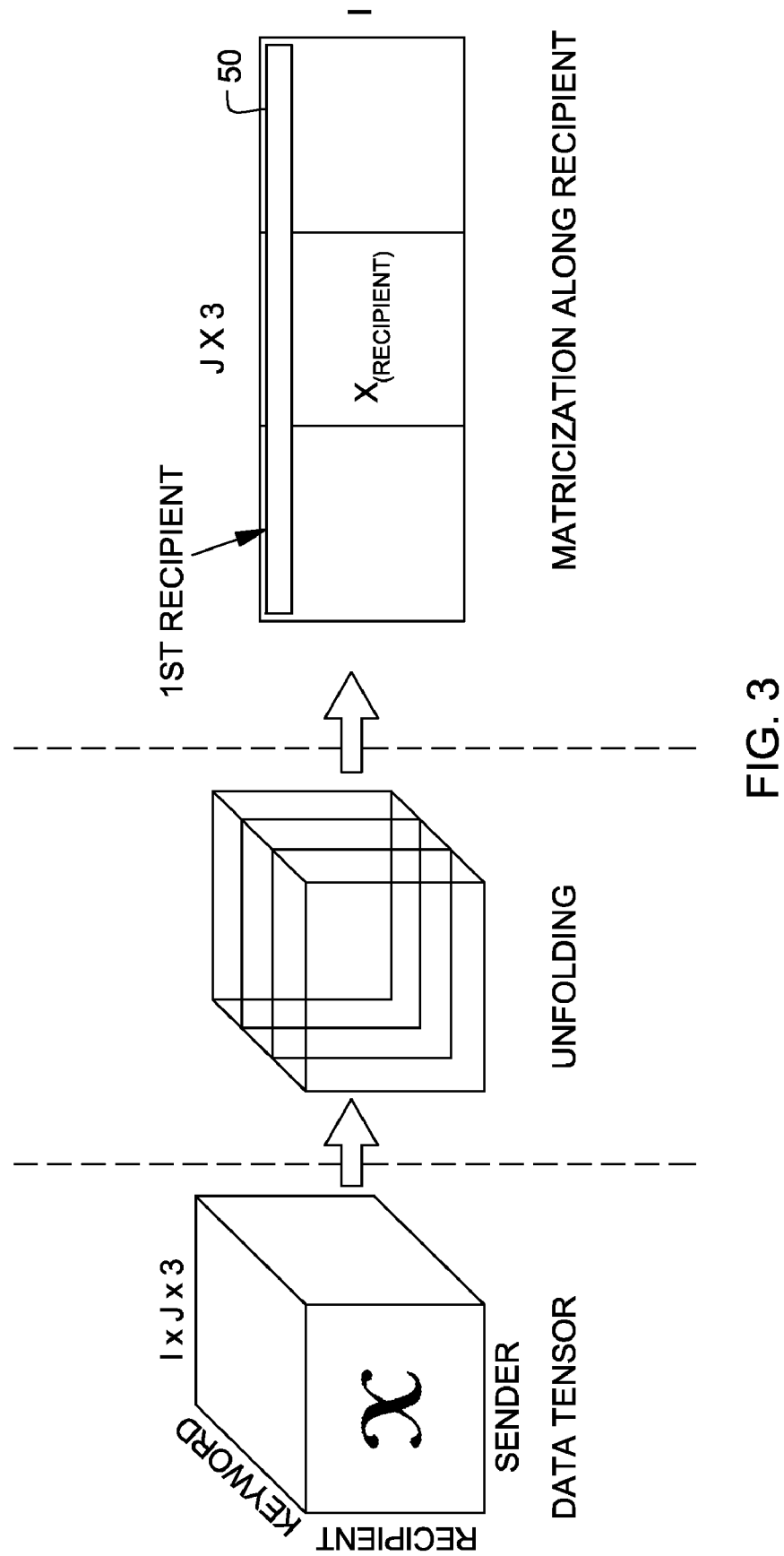
FIG. 3 depicts conceptually a tensor matricization process for generating extremely high dimensional vectors according to embodiments of the present invention.

One way of analyzing the i-th mode of tensor $X \in \Re^{I_1 \times \cdots \times I_N}$ is to matricize X along the i-th mode, i.e., construct the matrix $X(i) \in \Re^{I_i \times \cdots \times I_{i-1} \times I_{i+1} \times \cdots \times I_N}$. Then, the row vectors of X(i) are modeled. As shown in the example analysis method of FIG. 3, which depicts a tensor matricization that generates extremely high dimensional vectors such as, the row vector 50 in $x_{recipient}$ shown in FIG. 3, the matricization of $X \in \Re^{I \times J \times 3}$ along the recipient mode provides "I" recipient vectors of size J×3.

To avoid a computationally expensive approach due to the modeling of extremely high dimensional vectors, and, avoid possibility of overfitting (due to the high dimensionality, the sample size (i.e., the number of row vectors) is small and prone to overfitting), the method includes applying a tensor decomposition operation on the input data tensor, as shown at step 71, FIG. 2, to reduce the dimensionality of all modes to facilitate robust and efficient cluster analysis. More specifically, a well-known Tucker decomposition technique may be adopted with two different algorithms embodied as computer program instructions for execution by the processing unit:
1) High-Order SVD (HOSVD) algorithm: The HOSVD, such as depicted in HOSV) pseudo-code in algorithm 1 using generic terminology as follows,

---

Algorithm 1: HOSVD(tensor $\mathcal{X} \in \mathbb{R}^{I_1 \times \cdots \times I_M}$, core sizes $R_d|_{d=1}^M$)

Output: factor matrices $U^{(d)}|_{d=1}^M$ and core tensor $\mathcal{Y} \in \mathbb{R}^{R_1 \times \cdots \times R_M}$
1 for d = 1 to M do
    | // Find the covariance matrix of
    | mode-d matricization
2  | $C = X_{(d)} X_{(d)}^T$
3  |_ Set $U^{(d)}$ to be the $R_d$ leading left eigenvectors of C
4 $\mathcal{Y} = \mathcal{X} \times_1 U^{(1)T} \cdots \times_M U^{(M)T}$ // Compute the core tensor

--- treats all the modes independently and performs matrix SVD on every matricization of the tensor; 2) High-Order Orthogonal Iteration (HOOI): The HOOI, such as depicted in HOOI pseudocode illustrated in algorithm 2 as follows,

---

Algorithm 2: HOOI(tensor $\mathcal{X} \in \mathbb{R}^{I_1 \times \cdots \times I_M}$, core sizes $R_d|_{d=1}^M$)

Output: factor matrices $U^{(d)}|_{d=1}^M$ and core tensor $\mathcal{Y} \in \mathbb{R}^{R_1 \times \cdots \times R_M}$
1 Initialize factor matrices $U^{(d)}|_{d=1}^M$ using HOSVD(Algorithm 1)
2 while not converged do
3  | for d = 1 to M do
    | | // Project onto all but the d-th
    | | factor matrices
4  | | $\mathcal{Z} = \mathcal{X} \times_1 U^{(1)T} \cdots \times_{d-1} U^{(d-1)T} \times_{d+1} U^{(d+1)T} \cdots \times_M U^{(M)T}$
5  | | Set $U^{(d)}$ to be the $R_d$ leading left eigenvectors of
    |_ |_ $Z_{(d)} Z_{(d)}^T$
6 $\mathcal{Y} = \mathcal{X} \times_1 U^{(1)T} \cdots \times_M U^{(M)T}$ // Compute the core tensor

--- performs alternating optimization to find better factor matrices iteratively. HOSVD can be considered a special case of HOOT with only one iteration.

After the decomposition, the factor matrices $U^{(i)} \in \Re^{I_i \times R_i}$ for i=1, ..., M provide low-dimensional subspaces on each mode. For example, as shown in FIG. 2, the recipient subspace is an I×R factor matrix 45. Compared to the simplistic matricization, the space saving on the i-th mode is in the order of $O(\Pi_{n \neq i} I_n/R)$. In general, HOSVD is much more computationally efficient, while HOOI gives better approximation accuracy. In either case, the cost of tensor decomposition is paid only once.

Thus, as shown in FIG. 2, there is computed, from multimode input data tensor X, a core-tensor G 48 that is a lower dimensioned tensor having weights (scaling factors) between groups (of lower dimensions) with the co-factor matrix C 37 providing in the smaller dimensional representation a set of weights (e.g., a concept, term, topic being a "soft-clustering" of words (a certain frequency of words providing a high "weight")), e.g., vectors. Thus, e.g., co-factor matrix A 33 is a recipient community being a soft-clustering (a lower dimension matrix) of the recipients, and co-factor matrix B 35 being the soft-clustering (a lower dimension matrix) of the senders.

As people typically e-mail or speak using clusters of terms, a lower dimensional vectors can be used in their representation. Similarly, words can be characterized by which people use the terms; thus, a word can be described by groups of people. This joint low-dimensional representation of the terms is the aspect to provide sender recipient or keyword sub-matrices.

Further in the above-described "e-mail" example, the body (content) of an e-mail may be a treated as a separate dimension; alternately, the subject-line of an e-mail may be a represented as a separate dimension. This is an implementation choice depending upon the vocabulary chosen for the subject line versus the vocabulary chosen of the body, e.g., the vocabulary may more concise in the subject line.

Thus, in the analysis using tensor decomposition described herein, dimensions are chosen, i.e., looked at independently (the rows or columns) and chose groups, including groups of people and terms, to participate and having some weight. The weight may be a linear combination of words, for example. The weight may further be based on the calculation of a centroid in one embodiment. Thus, factor-matrices A 33, an I×R matrix with "R" recipient communities, each one a soft-clustering of the original I recipients, B 35 an J×S matrix with "S" sender communities, each one a soft-clustering of the original J senders, and, C 37, an K×T matrix with "T" concepts, each one a soft-clustering of the original K words, e.g., vocabulary of English words, when multiplied, and scaled according to the corresponding entry of the weight in core-tensor matrix G 40 s and will represent an approximation of the original input data tensor achieved with weights chosen such that the original matrix is constructed within a minimum squared error. Thus, for example, a first row of lower dimensioned recipient matrix A 33 multiplied element-wise by first row of lower dimensioned sender matrix B 35, and multiplied element-wise by a first "concept" (a first soft-clustering of words) represented by a first row of lower dimensioned matrix C 37 all scaled by the entry at location (e.g., location 1,1,1) of the matrix G 40, reflect the joint contribution of the first (soft-cluster) of recipient groups for a first (soft-cluster) of sender groups and a first (soft-cluster) representing a concept, for example, a clustering of words of in a row of C). In this manner, a sender community, recipient community and a concept entries, can be multiplied and scaled (from corresponding entry in G) to obtain the individual contribution of this combination of communities and concept in the original input data tensor.

Thus, there is needed to choose the low dimensional representation (weights) (people, terms) which are not independent, but takes into account the dimensions to project the people vectors (e.g., the English words people use) jointly to produce a good approximation of the whole original input data tensor.

When the original tensor is too big to be decomposed entirely, biased sampling may be performed on the dimensions based on the marginal norm distribution along each mode. A similar sampling algorithm has been used for Tensor CUR decomposition such as described in the reference to P. Drineas and M. W. Mahoney entitled "A randomized algorithm for a tensorbased generalization of the svd", Technical Report YALEU/DCS/TR-1327, Yale Univ., 2005, incorporated by reference herein. Example pseudo-code representing functionality for tensor sampling is shown in algorithm 3 as follows:

---

Algorithm 3: TENSORSAMPLING(tensor $\mathcal{X} \in \mathbb{R}^{I_1 \times \ldots \times I_M}$, sample sizes in $J_d|_{d=1}^{M}$)

---

Output: sampled tensor $\mathcal{Y} \in \mathbb{R}^{J_1 \times \ldots \times J_M}$
1 for d = 1 to M do
 | // marginalize along each mode
2 |  z = rownorm($X_{(d)}$)
3 |_ Select the $J_d$ dimensions with largest entries in z
4 Construct the tensor $\mathcal{Y}$ induced by the selected dimensions
5 ─────────────────
6 SubAlgorithm rownorm(matrix $A \in \mathbb{R}^{M \times N}$)
7 for d = 1 to M do
 | // compute the norm of the i-th row
8 |_ z(d) = $\|a_{d:}\|$
9 return $V_z$

---

After that, a tensor decomposition is applied on the small sub-tensor induced by the sampled dimensions to find the subspaces for each mode.

It should be understood that other dimensionality reduction techniques may be employed in this context, e.g., topic modeling.

Single-Mode Clustering

As further depicted in the overall network analysis through tensor decomposition process using the "e-mail" tensor example depicted in FIG. 2, there is performed the next step 81 of Single-mode clustering utilizing a processing unit programmed with computer program instructions embodying methods for performing Single-mode clustering by the processing unit.

In single-mode clustering, the dimensions along a specific mode are clustered, i.e., with the result of finding the cluster labels C(d) (using generic definitions of dimension cluster and clustering provided herein above). The overall clustering utilizes both the factor matrices A, B, C and the core tensor G calculated in the prior step. First, this aspect of the invention requires constructing low-dimensional points. Afterwards, any hard clustering algorithm is then applied on them. In one embodiment, a k-means clustering algorithm can be used, but other clustering algorithms are contemplated to derive hard-groups which are easy to visualize and present to a user, e.g., hierarchical clustering.

Thus, as shown in FIG. 2, the rows of the recipient matrix A are subject to k-means or like hard clustering algorithm which generates A1, A2, A3, ... (a hard partitioning 43 of recipients), Likewise, the rows of the sender matrix B are subject to k-means or like hard clustering algorithm which generates B1, B2, B3, ... (a hard partitioning 45 of senders), and likewise, the rows of the concepts matrix C are subject to k-means or like bard clustering algorithm which generates C1, C2, C3, ... (a hard partitioning 47 of concepts) are sets of English words.

Depending on whether a specific dimension is used in the tensor decomposition (i.e., is included in the sample) or not, each dimension may be handled in a different way. In this process, the dimensions used in the tensor decomposition is defined (and referred to herein) as "training" dimensions and the rest of the dimensions as "testing" dimensions.

For example, if the i-th dimension in mode-d is used in the decomposition, the low-dimensional point is the mode product of the core tensor $\mathcal{Y}$ and the i-th row of factor matrix $U^{(d)}$. Formally, the low-dimensional point $Z \in \mathfrak{R}^{R_1 \cdots R_{d-1} R_{d+1} \cdots R_M}$ is governed according to equation 3) as follows:

$$z = \text{vectorize}(\mathcal{Y} \times_d U_{i:}^{(d)}) \quad (3)$$

If the i-th dimension in mode-d is not used in the decomposition, it is approximated using all the other factor matrices except the $U^{(d)}$. Let S denote the slice of the i-th dimension along mode-d of the tensor X. Then, the low dimensional point $Z \in \mathfrak{R}^{R_1 \cdots R_{d-1} R_{d+1} \cdots R_M}$ can be computed in accordance with equation 4) as follows:

$$z = \text{vectorize}(S \times \{U^{(j)T}\}_{j \neq d}) \quad (4)$$

Figure 4:
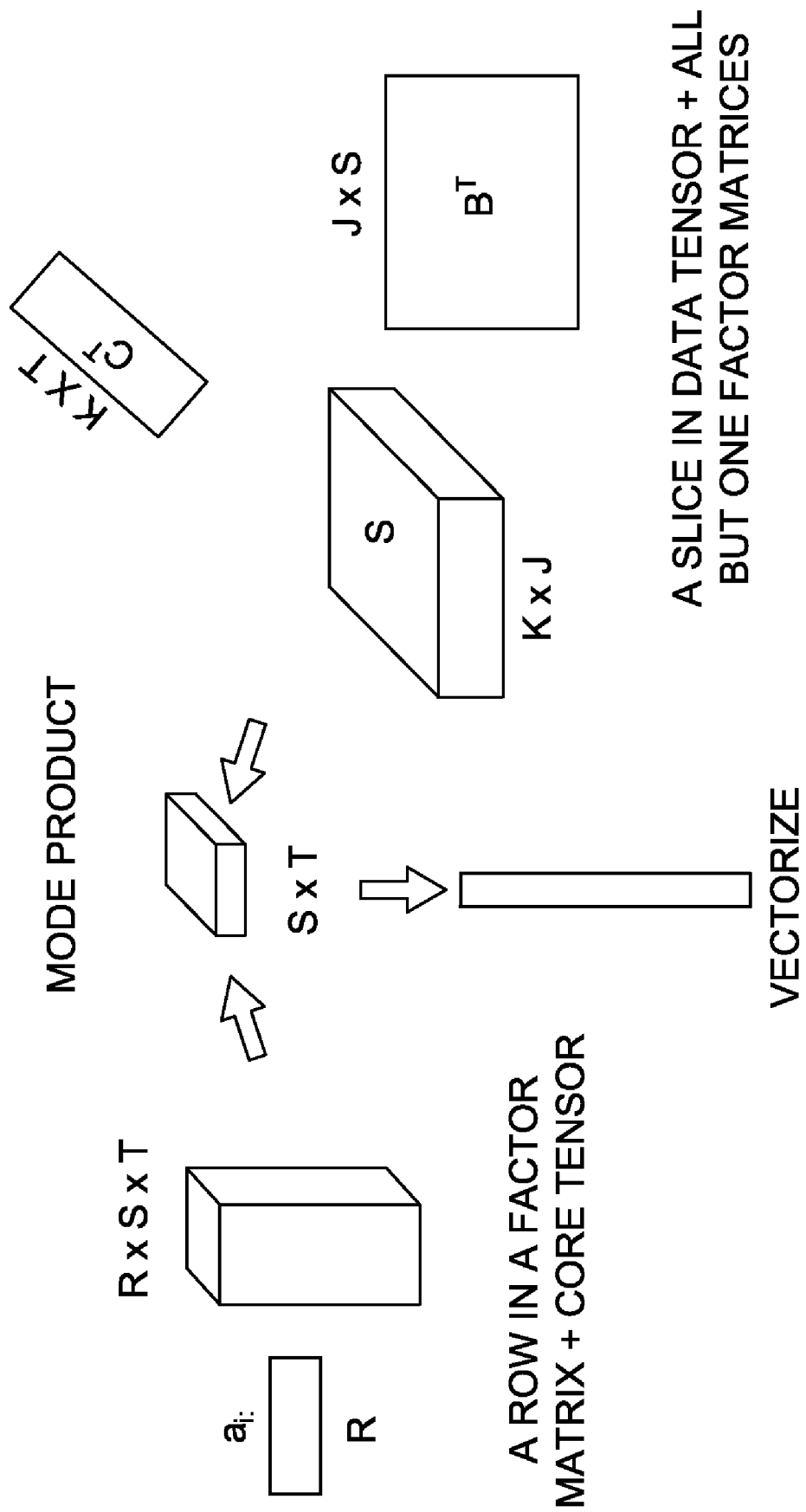
FIG. 4 depicts conceptual construction of the low-dimensional point according to embodiments of the present invention.

A pictorical view for constructing a low dimensional point for the example "e-mail" tensor is shown in FIG. 4. From the Tucker decomposition, it follows that the calculated low-dimensional point z (calculated according to eq. 4) is equivalent to the normal low-dimensional point z (calculated according to eq. 3) given the orthogonality of $U^{(n)}$. That is, it is assumed that the data tensor is precisely represented as the mode products between the core and factor matrices. If $X \approx \mathcal{Y} \times \{U\}$ (instead of strict equality), the equivalence of Equation 3 and Equation 4 becomes approximate as well. In terms of computation, Equation 3 is much more efficient than Equation 4, which implies that constructing low-dimensional points for training dimensions is much easier than for the testing dimensions. Algorithm 4 below illustrates example pseudo-code embodied as computer program instructions for execution by the processing unit describing a method for constructing low-dimensional points (for the case of "training" dimensions) and for constructing low-dimensional points (for the case of "testing" dimensions) in an example embodiment.

---

Algorithm 4: SINGLE-MODE-CLUSTER(cluster mode d, Data tensor $\mathcal{X}$, factor matrice $\{U^{(i)}\}$, core tensor $\mathcal{Y}$)

---

1 foreach dimension i in the d-th mode do
2 |  if dimension i is a training dimension then
 | | // Mode-product of core and $U^{(d)}$
3 | |_ z = vectorize($\mathcal{Y} \times_d u_{i:}^{(d)}$)
4 | else
5 | |   Find the slice $\mathcal{S}$ of dimension i along the d-th
 | |    mode
 | |    // Project on all but the d-th
 | |    factor matrics
6 | |_ z = vectorize($\mathcal{S} \times \{U^{(j)T}\}_{j \neq d}$)
 |    // store the low-dimensional point
7 |_ $z_{i:}$ = z
8 cluster the rows of Z
9 return cluster assignments

---

The core tensor size is an input parameter, which is typically set to be much smaller than the size of the data tensor.

Cross-Mode Clustering

In the overall network analysis through tensor decomposition process using the "e-mail" tensor example depicted in FIG. 2, there is performed the next step 91 of Cross-mode clustering utilizing a processing unit programmed with computer program instructions embodying methods for performing Cross-mode clustering by the processing unit.

After identifying the clusters within each mode: A1, A2, A3, ... (hard partitioning 43 of recipients), B1, B2, B3, ... (a hard partitioning 45 of senders), C1, C2, C3, ... (a hard partitioning 47 of terms or concepts), the clusters are correlated across different modes. The goal is to explain a specific cluster by the related clusters from the other modes. For example in the "e-mail" tensor, a recipient cluster can be explained by the fact that they receive emails from specific sender clusters about specific topics (i.e., clusters of keywords). In other words, a cluster becomes clearer only in the context of related clusters from other modes. Thus, all combinations of recipients vs. sender vs. topics are computed forming a cross-mode cluster (a triplet 55) and the densest combinations are determined. In an embodiment depicted in FIG. 2, the set of dimension clusters senders B3 and recipients A2 are densest when correlated with concept or topic C3 as shown as triplet 57.

Thus, the cross-mode clusters (Cross-mode cluster discovery) are found by applying the definition provided herein above for finding the M-tuples $\{C\} \equiv \{C^{(1)}, \ldots, C^{(M)}\}$ that represent the interesting cross-mode clusters. The subtensor induced by the cross-mode cluster $\{C\}$ is denoted as $X\{C^{(1)}, \ldots, C^{(M)}\}$. Thus, a mode $C^{(d)}$ may be omitted when all dimensions in mode d are included in the cross-mode cluster.

Given the definition of cross-mode cluster, the densest cross-mode clusters are found. The density of $\{C\}$ is defined as the density of its induced subtensor $X(\{C\}) \in \Re^{K_1 \times \ldots \times K_M}$, or formally, $\|X(\{C\})\|/\Pi_i K_i$. This serves as an effective measure of the "interestingness" of a cross-mode cluster. More specifically, in a further advantageous embodiment, the process includes identifying the dense cross-mode clusters defined by a sub-tensor, such as a rectangular sub-tensor, in the embodiment described herein.

A simple solution is to enumerate all the clusters along each mode, to compute the density for all the cross-mode clusters, and to identify the densest ones. However, without indexing, the worst cost for every such cross-mode cluster density calculation operation is linear with respect to the number of non-zeros in the tensor. A better solution leverages the fact that the tensor norm can be incrementally computed. That is, the method can sequentially scan over the non-zeros in the tensor; update the corresponding norms of the sub-tensor induced by cross-mode clusters; finally, pick those with the highest density. Note that the temporary norm counters will only be created when needed, in order to avoid unnecessary storage for empty cross-mode clusters.

The present invention may be enhanced for modeling and analyzing the time evolution of social communication networks and the content related to such networks.

Figure 5:
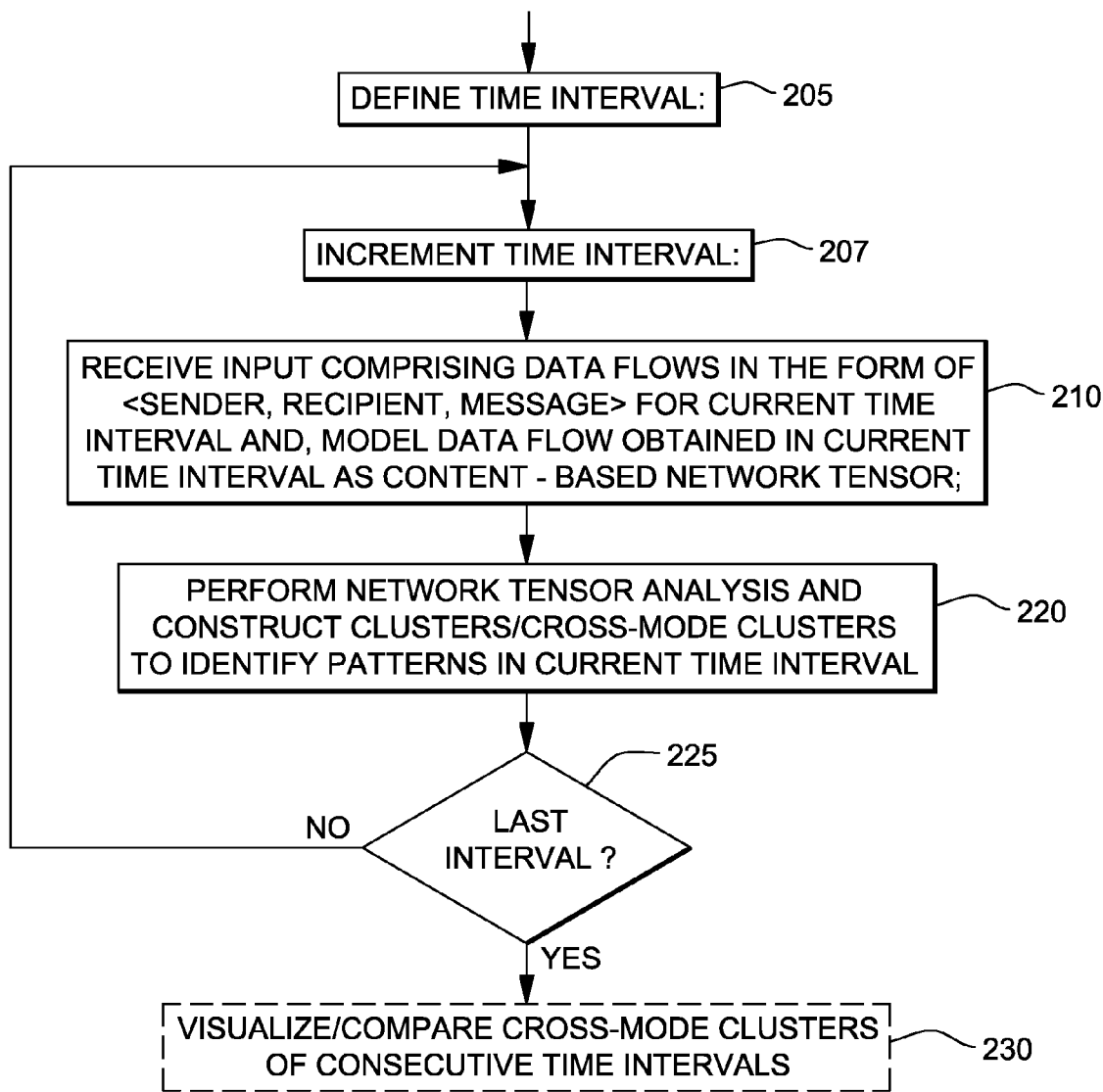
FIG. 5 illustrates a flow chart depicting of method steps for performing a time-evolving analysis of social networks according to principles embodiments of the invention; and, FIG. 6 shows a hierarchical visualization 300 including two navigation paths 301, 302, based, for example, on an example corpus of e-mail data.

FIG. 5 illustrates a flow chart depicting a method 200 for performing a time-evolving analysis of social networks according to principles of the invention. In this method, a set of non-overlapping or possibly overlapping time-based windows is first constructed 205. Each window is specified by a starting time instant and a time duration and the windows are ordered based on their starting times. Each window is comprised of the data for the corresponding period of time. Any time granularity may be chosen as an input, for example, an aggregation of day, week, month, etc. For each window there is specified a starting time and a duration. The time windows may overlap, i.e., characterizing the window as a "sliding" window. For example, instead of consecutive window that start at every Monday (for a window of time corresponding to a week), intervals may start Monday to Sunday in one week and Tuesday to Monday in the following week and Wednesday to Tuesday in the next, etc. (overlapping windows).

As shown in FIG. 5, for a current time window 207, there is provided input data (network message flow data comprising <sender, recipient, message> tuples) from that corresponding window of time and a network tensor (a 3-way tensor X) is constructed at 210. Then, at 220, the network analysis is performed as described herein to obtain lower rank approximations and obtain single and correlated clusters used for identifying interpretable patterns of the form "who talks to whom about what", for example, as described herein with respect to FIG. 2. At step 225, there is determined whether data from the last time interval has been processed and analyzed in which case the algorithm either returns to step 207 to repeat processing of the next successive time interval or, exit perhaps, for visualizing the results obtained. Thus, the steps 205 to 220 are repeated for each defined time interval. At a final step 230, there is performed the generation of a display for visualizing and comparing of cross-mode clusters (interpretable patterns) of consecutive time intervals. Thus, for example, an explicit bunch of constructed clusters over a first period of time is generated and then the same clusters are computed over a second period of time, e.g., consecutive, which are examined to determined how those clusters change.

In one example, the sender and recipient communities and concepts may not have changed much from time period to time period (e.g., week to week) such that results of the prior time windows may be used to speed up the approximations for the next time window (thus, the iterations may converge must faster given the data using the weights from a previous time window (iteration of last week). In this embodiment, the "seed" or centroid values used for the dimensionality reduction approximations from a prior time interval can be used in the approximations for tensor dimension reduction processed in the next succeeding time interval rather than using random seeds for each window processing.

Thus, for each time window, there is constructed a content-based network tensor as described herein above and, there is applied a similar analysis process involving the steps for content-based social network analysis using tensor factorization as depicted in FIG. 2 for each time window. Additionally, as mentioned above, the analysis of a given window may also take into account the patterns produced by the analysis of the previous window, in order to (i) speed up the computation of the new patterns, or (ii) produce time-consistent patterns, or (iii) both.

In an alternate embodiment, rather than performing an analysis of the three-way tensor (in the example of FIG. 5), the steps described herein with respect to FIG. 2 may employ using a four-way tensor (including a quadruplet aggregating a time dimension), and obtaining cross-mode clusters. However, obtaining clusters of time (e.g., days) in this manner does not take into account any order.

Thus, returning to FIG. 2, in an alternate embodiment, a four-way tensor is constructed, including the R, S and T inputs and an additional input specifying a time duration, e.g., how far back in time to obtain data and perform network analysis, e.g., 1 year or 365 days. This would result in the formation of additional factor matrix "D" 39 aggregated at a day granularity, going back 1 year for example.

Thus, in one embodiment, the steps may involve using a four-way tensor (including time dimension), and obtaining cross-mode clusters, a quadruplet aggregating a time dimension. Obtaining clusters of time (e.g., days) in this manner does not take into account any order. Alternately, there may be explicitly bunch constructed a clusters over a first period of time and then compute the same clusters over a second period of time, e.g., consecutive, and examine how those clusters change.

Besides converging faster (speed up computation) the data used to describe last week is relevant the next time interval. However, time consistent patterns may be generated such that previous patterns may be used and compared to previous time interval's pattern.

Having derived how to model a content-based network and how to efficiently and effectively find single mode clusters in a way that allows additional derivation of useful cross-mode clusters which reveal the key relationships among user communities and keyword concepts, this information is presented in a meaningful, clear and intuitive ways for users. In a further aspect of the invention, the patterns from network analysis provide a core structure for hierarchical and context-sensitive graph visualization.

From a computational perspective, the methodology of the invention addresses scalability issues. From a cognitive perspective, to address scalability there is employed advanced graph visualization techniques to achieve this goal.

To maintain a user's mental map, visualizations for huge graphs need to compute a layout, which strikes a balance between the general and the detailed information being displayed. To achieve this, a huge graph visualization method is provided as follows.

Clusters at multiple levels of the graph are generated by using the content-sensitive tensor clustering according to the method described herein. By way of example, a k-means algorithm is used recursively on the network dimension (recipient mode) with k=5, in an example embodiment, to construct hierarchical clusters. The clusters are stored in a database and are dynamically loaded level by level at runtime. Each cluster is visualized as a rectangle, which contains a subset of key nodes filtered by centrality scores (individual nodes from a leaf level and do not represent clusters from other, lower levels) within that cluster.

In a further embodiment, adaptive thresholding can be used on each level to determine the proper nodes to display. In all visualization, the threshold is intentionally set high in order to fit in multiple screenshots in one page. For interactive usage, a lot more nodes (on the order of a hundred at a given level) can be typically displayed.

Edge information is derived based on a selected content mode cluster (or set of clusters, if multiple content modes are had). Thus, the connections in the visualized graph represent the communication patterns for a specific "concept" (i.e., a set of keywords). For a given graph cluster, it is possible to show its corresponding cross-mode cluster on content dimension and other related nodes on the graph.

Finally, an energy based graph may be designed having a layout algorithm optimized to determine an optimal layout for the hierarchical graph at the selected level.

Figure 6:
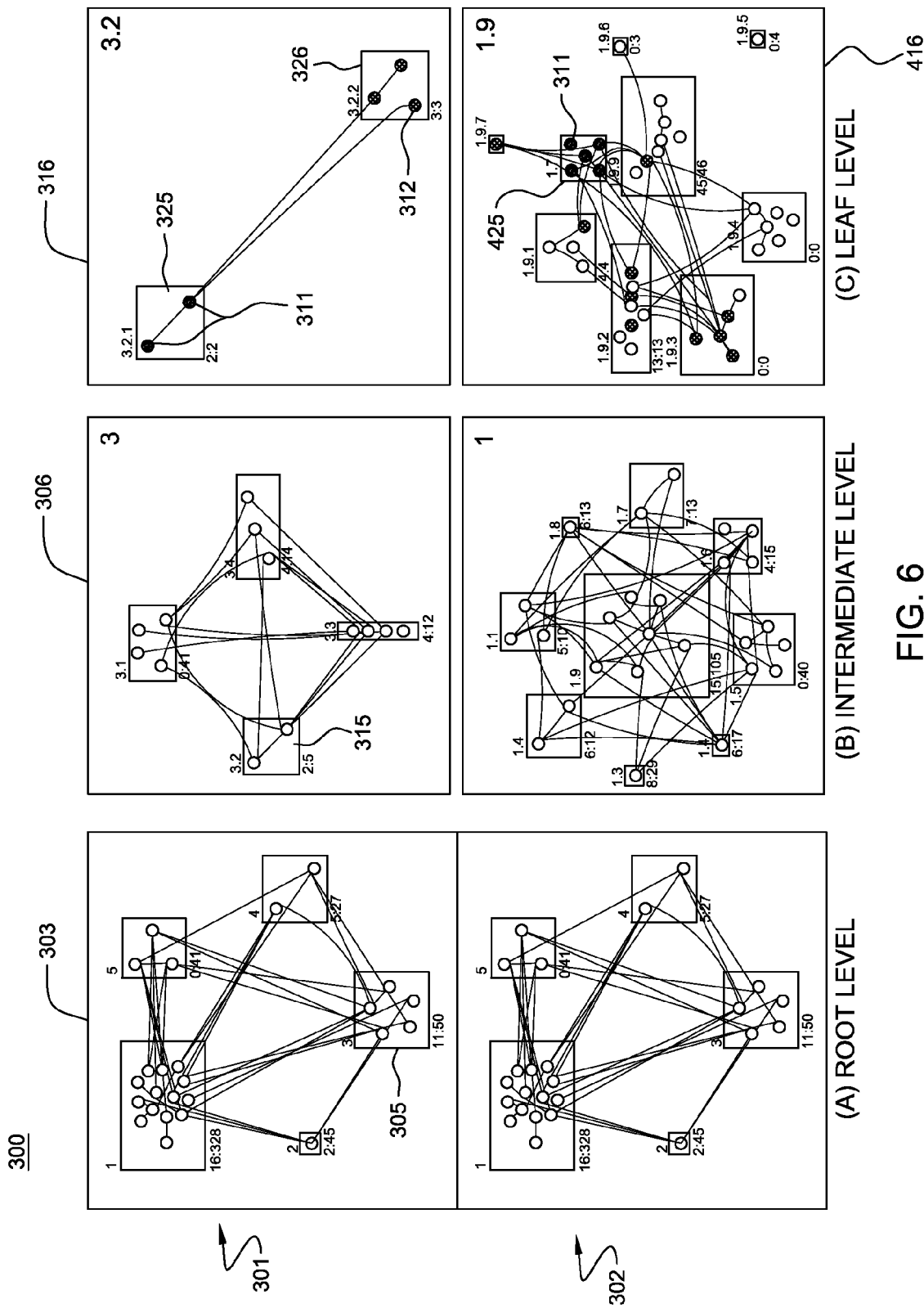

FIG. 6 shows a hierarchical visualization 300 including two navigation paths 301, 302, based, for example, on an example corpus of e-mail data (e.g., a 3rd-order (sender, recipient, term) tensor of predetermined size). At the leaf level the densest cross-mode clusters are highlighted which is related to the key-word cluster "California, crisis, San Francisco, Sacramento, government, price, power, demand, supply, regulation, market". The presence of circles 311, e.g., in leaf node 325, indicate the key people clusters and the indication of circles 312, e.g., in leaf node 326, indicate the people who directly connect to them.

An example use case is now described as follows: Starting from the root level, five clusters 303 are displayed and the key children (nodes) in those clusters shown in The first column (FIG. 6A). When a user clicks a cluster, such as cluster 305 (the third cluster of the five clusters 303 displayed at the root node), the system zooms-in to display that cluster shown in FIG. 6B as an intermediate-level cluster 306. As further shown, a user can click to select a cluster, such as cluster 315 (the second cluster of the clusters 306 displayed at the intermediate level), the system zooms-in to display that cluster shown in FIG. 6C as an leaf-level cluster 316. At any level, a user can decide to query a cluster for the related content clusters (through searching dense cross-mode cluster with respect to the query cluster). For example, on the leaf node 326 of the first row, a user may query the cluster 325, then the corresponding content cluster is presented, which is about key-words "California, crisis, San Francisco, Sacramento, government, price, power, demand, supply, regulation, market". Then user can further query, via a computer system, for a similar network cluster that is closely related to this content cluster, and the system generates for user visualization the leaf node 416 (the third column) of the second row 302. There, the nodes in cluster 425 and their neighbors are highlighted. In fact, both networks clusters consist of the key persons 311. With the help of both content-based network analysis and the hierarchical graph visualization, a user is able to interactively explore the data and to identify those cross-mode cluster easily, which demonstrates the power of this hybrid approach for facilitating user understanding.

Figure 7:
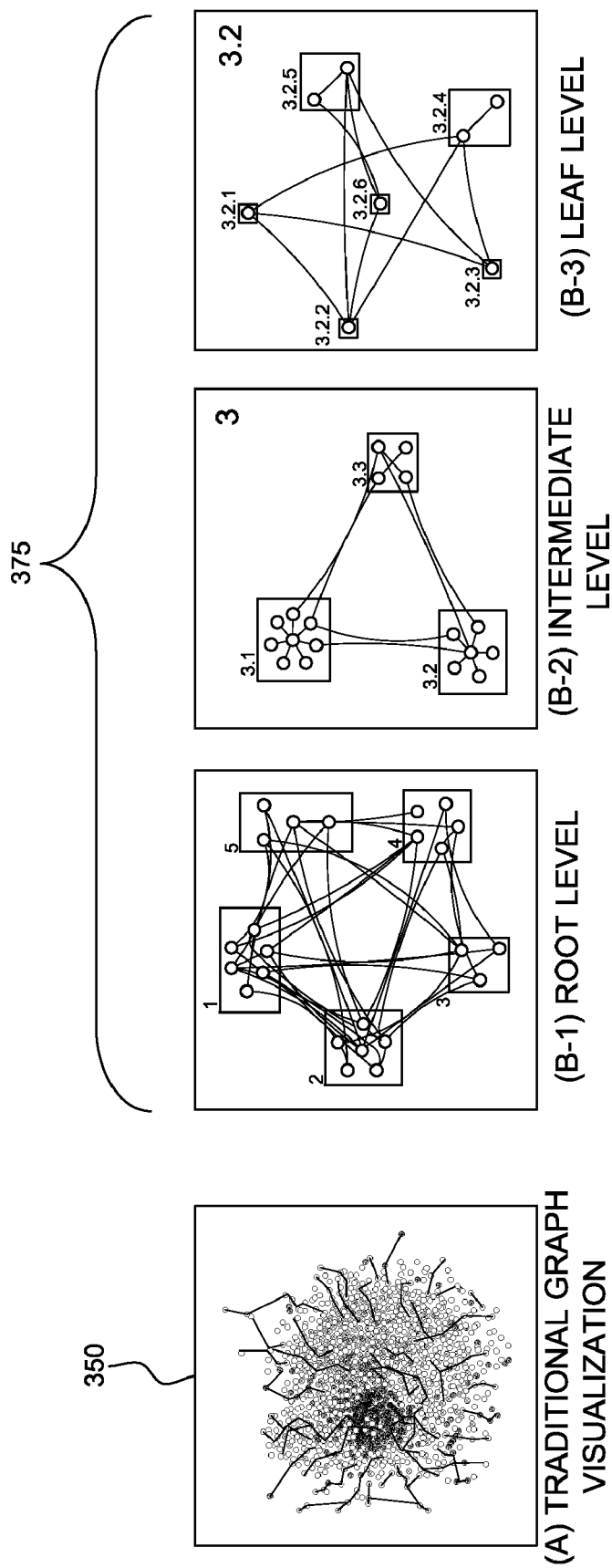
FIG. 7 depicts a comparison of two sets of visualization data with and without clustering; and, FIG. 8 shows a computing environment that may be used to carry out embodiments of the present invention.

Another obvious benefit is shown in FIG. 7 which depicts a comparison of two sets of visualization data with and without clustering. FIG. 7(A) shows a large graph generated for visualization that even with the ability to display all the nodes on the screen, the user is unlikely to comprehend the data as shown in the example data 350 processed for visualization in FIG. 7(A); on the other hand, with the help of content-based network tensor analysis as described herein, FIG. 7(B) provides a much more intuitive visualization 375.

Thus, the system, method and computer program product for analyzing, summarizing, navigating and searching the corpus of information present in time-evolving, content based social networks enables one, e.g., a business analyst, to determine answers to example questions relating to: what are the key topics or areas of expertise within an enterprise or company; which are the key groups of experts in each of these areas; how do areas of expertise relate to each other; which areas of expertise does an individual belong to; and, how are groups of experts in different areas related to each other.

Figure 8:
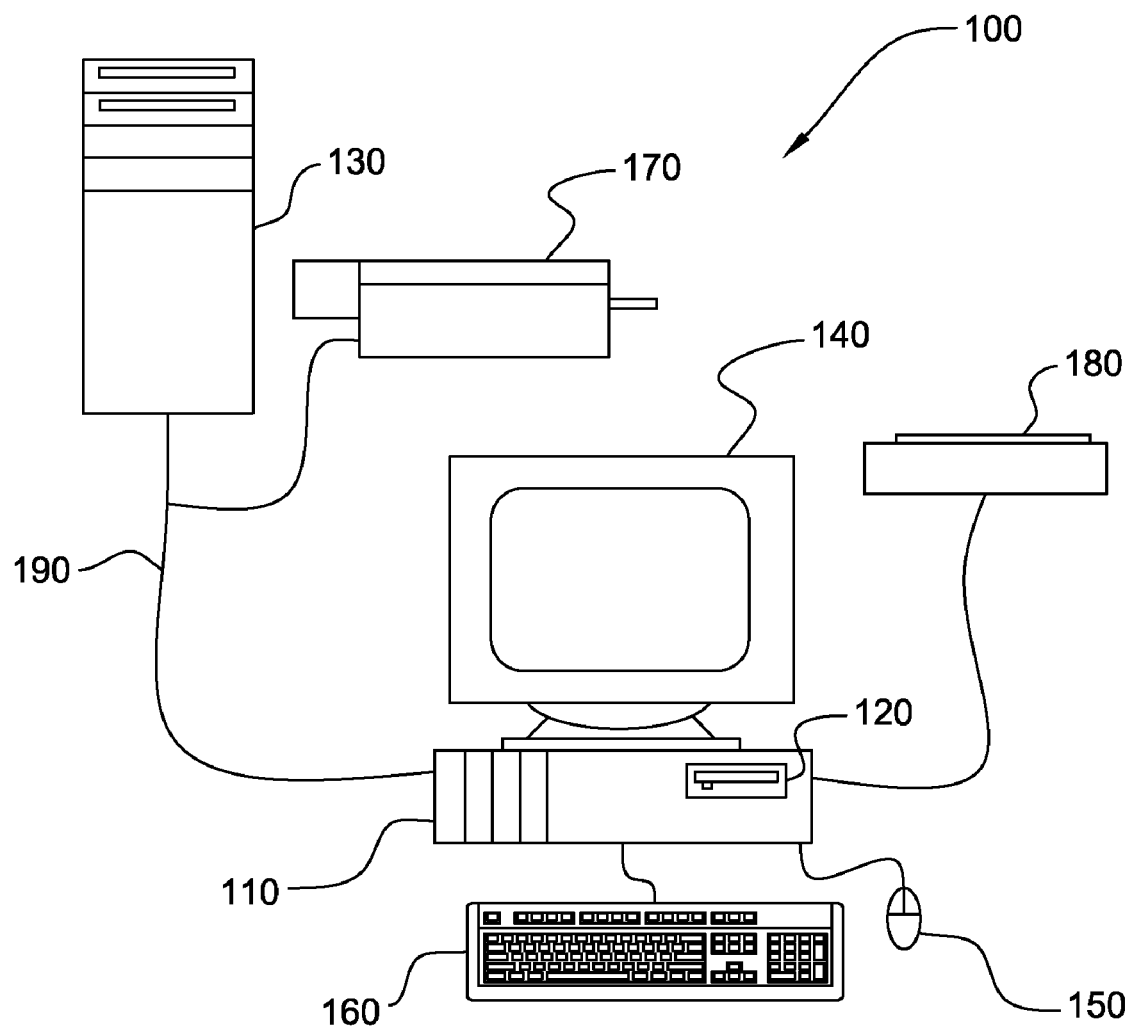

A computer-based system 100 in which a method embodiment of the invention may be carried out is depicted in FIG. 8. The computer-based system 100 includes a processing unit 110, which houses a processor, memory and other systems components (not shown expressly in the drawing) that implement a general purpose processing system, or computer that may execute a computer program product. The computer program product may comprise media, for example a program storage device or compact storage medium such as a compact disc, which may be read by the processing unit 110 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface 190. Monitor 140, mouse 150 and keyboard 160 are coupled to the processing unit 110, to provide user interaction. Scanner 180 and printer 170 are provided for document input and output Printer 170 is shown coupled to the processing unit 110 via a network connection, but may be coupled directly to the processing unit. Scanner 180 is shown coupled to the processing unit 110 directly, but it should be understood that peripherals might be network coupled, or direct coupled without affecting the ability of the processing unit 110 to perform the method of the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented system for modeling and analyzing the time evolution of social communication networks and a content related to such networks, said system comprising:
    an input device configured for receiving data representing a social communication network;
    a processing unit coupled to said input device for:
        (a) constructing a multi-mode tensor having one or a plurality of content dimensions and one or a plurality of network dimensions, said constructing being performed at each of a plurality of successive time intervals;
        (b) decomposing the multi-mode tensor into a core tensor and a set of factor matrices, one factor matrix for each mode;
        (c) modeling each mode of the tensor, wherein the modeling comprises treating each corresponding factor matrix as a low-dimensional representation of that mode, and grouping rows of each factor matrix into clusters based on a distance measure;
        (d) modeling a cross-mode correlation, wherein the cross-mode correlation comprises clustering each modeled mode of the multi-mode tensor, enumerating all combinations of clusters across different modes and identifying the cross-mode clusters that induce dense sub-tensors; and
        (e) generating a visualization of the modeled cross-mode correlation; and
    an output device configured for visualizing the modeled cross-mode correlation.

2. The computer-implemented system as claimed in claim 1, further comprising receiving a content dimension representing a body or a topic of a message communicated from a respective sender to a recipient over said network.

3. The computer-implemented system as claimed in claim 1, further comprising performing a tensor decomposition to reduce dimensionality of the social communication networks.

4. A method implemented in a computer system for modeling and analyzing social communication networks and a content related to such networks, wherein the computer system includes at least one processor unit, the method comprising:
    constructing a data representation of a social communication network as a multi-mode tensor having one or a plurality of content dimensions and one or a plurality of network dimensions;
    decomposing the multi-mode tensor into a core tensor and a set of factor matrices, one factor matrix for each mode;
    modeling each mode of the tensor, wherein the modeling comprises treating each corresponding factor matrix as a low-dimensional representation of that mode, and grouping rows of each factor matrix into clusters based on a distance measure;
    modeling a cross-mode correlation, wherein the cross-mode correlation comprises clustering each modeled mode of the multi-mode tensor, enumerating all combinations of clusters across different modes and identifying the cross-mode clusters that induce dense sub-tensors; and
    generating a visualization of the modeled cross-mode correlation;
    wherein a program using the at least one processor unit executes one or more of said constructing, decomposing, modeling each mode, modeling a cross-mode correlation, and generating steps.

5. The method as claimed in claim 4, further comprising receiving a content dimension representing a body or a topic of a message communicated from a respective sender to a recipient over said network.

6. The method as claimed in claim 4, further comprising performing a tensor decomposition to reduce dimensionality of the social communication networks.

7. The method as claimed in claim 6, further comprising performing a similarity search on the reduced dimensional presentation.

8. The method as claimed in claim 6, further comprising clustering dimensions based on the reduced dimensional presentation.

9. The method as claimed in claim 4, wherein said data representation of a social communication network further includes a time dimension.

10. The method as claimed in claim 4, further comprising:
    constructing a corresponding data representation of said social communication network at each of successive corresponding time intervals.

11. The method as claimed in claim 10, wherein each successive corresponding time interval overlaps in time with a previous time interval.

12. A method implemented in a computer system for modeling and analyzing the time evolution of social communication networks and a content related to such networks, wherein the computer system includes at least one processor unit, the method comprising the steps of:
    constructing a data representation of a social communication network as a multi-mode tensor having one or a plurality of content dimensions and one or a plurality of network dimensions, said constructing being performed at each of a plurality of successive time intervals;
    decomposing the multi-mode tensor into a core tensor and a set of factor matrices, one factor matrix for each mode;

modeling each mode of the tensor, wherein the modeling comprises treating each corresponding factor matrix as a representation of that mode, and grouping rows of each factor matrix into clusters based on a distance measure;

modeling a cross-mode correlation, wherein the cross-mode correlation comprises clustering each modeled mode of the multi-mode tensor, enumerating all combinations of clusters across different modes and identifying the cross-mode clusters that induce dense sub-tensors; and generating a visualization of the modeled cross-mode correlation;

wherein a program using the at least one processor unit executes one or more of said constructing, decomposing, modeling each mode, modeling a cross-mode correlation, and generating steps.

13. The method as claimed in claim 12, wherein, for each time interval, said constructing said data representation includes receiving a content dimension representing a body or a topic of a message communicated from a respective sender to a recipient over said network.

14. The method as claimed in claim 12, further comprising: receiving specification of one or more of a starting time instant and a time duration for said time intervals.

15. The method as claimed in claim 12, further comprising performing a tensor decomposition to reduce dimensionality of the social communication network for each time interval.

16. The method as claimed in claim 12, further comprising performing a similarity search on the reduced dimensional presentation at each time interval.

17. The method as claimed in claim 16, further comprising clustering dimensions based on the reduced dimensional presentation at each time interval.

18. The method as claimed in claim 12, wherein each successive corresponding time interval overlaps in time with a previous time interval.

19. The method as claimed in claim 12, further comprising: utilizing a processing result from a prior time interval to speed up approximations for reducing dimensionality of the data representation provided in a next successive time interval.

20. A non-transitory computer usable medium, comprising:

a computer readable program to execute a plurality of instructions in a processing unit for modeling and analyzing the time evolution of social communication networks and a content related to such networks, the computer readable program, when executed by the processing unit, causes the processing unit to perform the steps comprising:

constructing a data representation of a social communication network as a multi-mode tensor having one or a plurality of content dimensions and one or a plurality of network dimensions, said constructing being performed at each of a plurality of successive time intervals;

decomposing the multi-mode tensor into a core tensor and a set of factor matrices, one factor matrix for each mode;

modeling each mode of the tensor, wherein the modeling comprises treating each corresponding factor matrix as a low-dimensional representation of that mode, and grouping rows of each factor matrix into clusters based on a distance measure;

modeling a cross-mode correlation, wherein the cross-mode correlation comprises clustering each modeled mode of the multi-mode tensor, enumerating all combinations of clusters across different modes and identifying the cross-mode clusters that induce dense sub-tensors; and generating a visualization of the modeled cross-mode correlation.

21. The computer usable medium as claimed in claim 20, further comprising performing a tensor decomposition on said data representation to reduce dimensionality of the social communication networks.

* * * * *